Aug. 14, 1951 A. V. LOUGHREN 2,564,578
WAVE-SIGNAL SAMPLING ARRANGEMENT
Filed Oct. 4, 1946 2 Sheets-Sheet 1

INVENTOR.
ARTHUR V. LOUGHREN
BY Harry C. Page
ATTORNEY

INVENTOR.
ARTHUR V. LOUGHREN
BY Harry C. Sage
ATTORNEY

Patented Aug. 14, 1951

2,564,578

UNITED STATES PATENT OFFICE 2,564,578

WAVE-SIGNAL SAMPLING ARRANGEMENT

Arthur V. Loughren, Great Neck, N. Y., assignor to Hazeltine Research, Inc., Chicago, Ill., a corporation of Illinois Application October 4, 1946, Serial No. 701,187

11 Claims. (Cl. 250—36)

Figure 2:
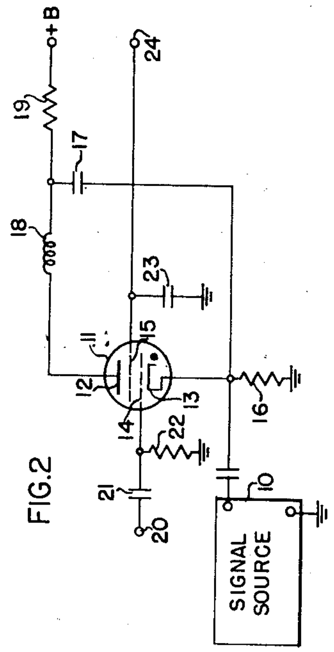

This invention is directed to arrangements for sampling wave signals, this is, for observing or measuring the amplitude of a wave signal during a sampling interval that is short with respect to the signal duration.

Arrangements of the type under consideration have a wide variety of applications in the fields of television and apparatus control as will be appreciated by those skilled in the art. For example, they may be employed in highly sensitive synchronizing systems wherein the sampled portion of a wave signal is compared with a standard to produce a control effect in accordance with the relative phase variations of the compared signals. Also, in television receiving systems they permit a portion of the received composite signal, representing a definitely established shade value such as black, to be monitored or sampled in order to establish the proper black level in the reproduced image. Furthermore, a sampling arrangement of the type described herein is illustrated in connection with an arrangement for converting a received television signal into a visible image in a novel television receiving system, the subject of an application for United States Letters Patent, Serial No. 120,405, filed October 8, 1949, as a continuation-in-whole of abandoned application Serial No. 701,188, filed October 4, 1946, in the name of Arthur V. Loughren and assigned to the same assignee as the present invention.

One sampling arrangement already known to the art includes a multielectrode vacuum tube having one grid to which the signal desired to be sampled is applied and having a second grid for receiving a triggering or keying pulse. In this arrangement the tube is conductive throughout the duration of the keying pulse to translate to its anode-cathode circuit that portion of the sampled signal which is coextensive in time with the keying operation. Usually, a detector or similar device is coupled to the anode-cathode circuit to derive a potential determined by the portion of the sampled signal translated through the tube. While such arrangements have operated satisfactorily for many installations they require a keying pulse of accurately controlled duration if the sampling is to be uniform. Additionally, most accurate results are obtained where the sampling interval is of exceedingly short duration which necessitates the use of correspondingly short keying pulses. Obviously, such pulses may not always be available in installations where a sampling process is desired to be carried out.

Other sampling systems have been proposed but they are subject to the same general limitations expressed above and frequently are too complicated and expensive for certain applications.

It is an object of the present invention, therefore, to provide a wave-signal sampling arrangement which avoids one or more of the above-mentioned limitations of prior arrangements.

It is another object of the invention to provide an improved and simplified arrangement to accomplish sampling of applied wave signals.

It is a specific object of the invention to provide an improved arrangement for obtaining accurate samples of uniform duration of an applied wave signal.

It is a further object of the invention to provide an improved arrangement for sampling a periodic signal and for controlling a characteristic of the signal in accordance with the results of the sampling process.

In accordance with the invention, an arrangement for deriving a potential representing the amplitude of a wave signal during a sampling interval comprises an electron-discharge device having an anode, a cathode and an intermediate electrode. The arrangement has an anode-cathode circuit for the electron-discharge device, and a signal supply coupled in circuit with the anode-cathode circuit for varying the potential of at least a portion of the aforesaid circuit with respect to a reference level in accordance with amplitude variations of the wave signal. The arrangement also has means for initiating an electron discharge in the aforesaid device, means for interrupting conduction in that device after a predetermined sampling interval, and an energy-storage device coupled to the intermediate electrode and to the cathode of the electron-discharge device for deriving a potential determind by the amplitude of the applied wave signal within the sampling interval.

For a better understanding of the present invention, together with other and further objects thereof, reference is had to the following description taken in connection with the accompanying drawings, and its scope will be pointed out in the appended claims.

Figure 1:
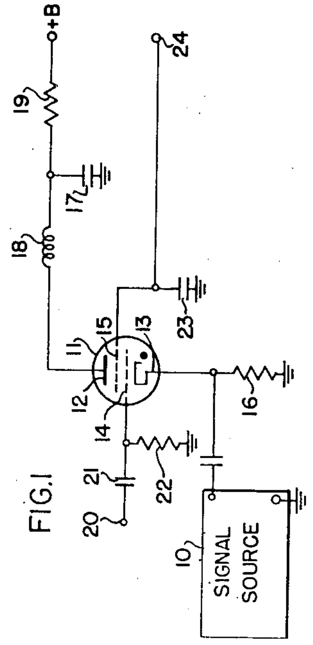
Figure 3:
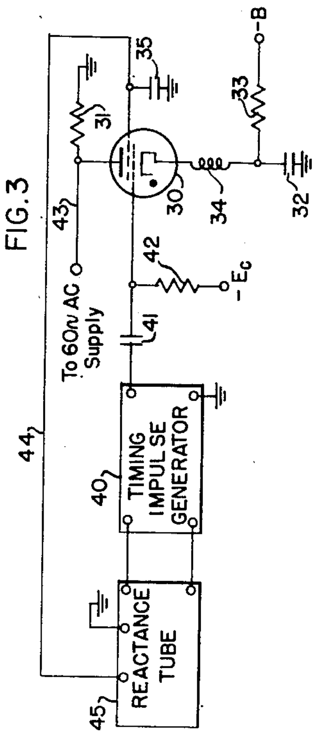
Figures 4, 5:
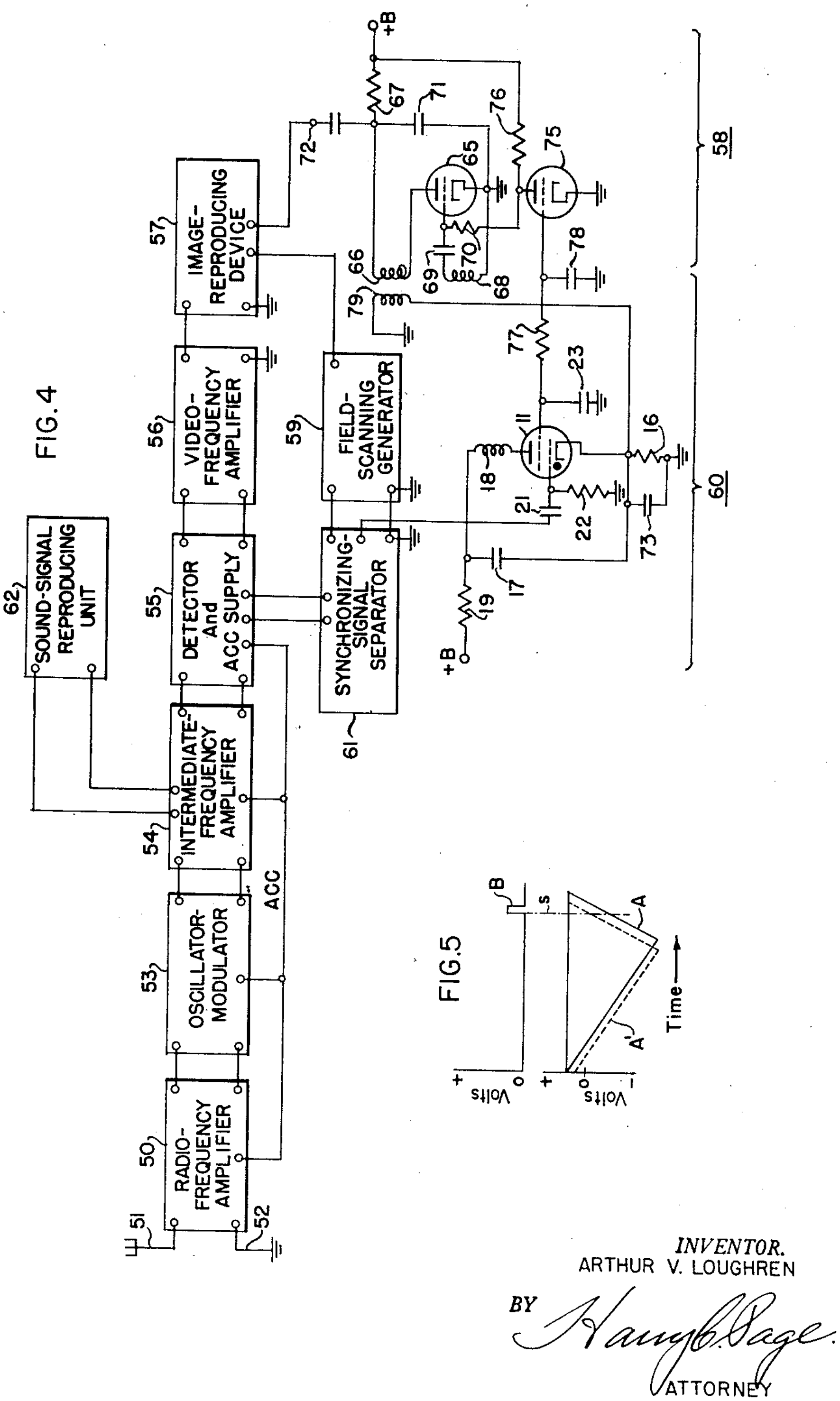

In the drawings, Fig. 1 is a schematic representation of one form of sampling arrangement in accordance with the invention; Fig. 2 represents a modification of the arrangement of Fig. 1; Fig. 3 represents a further modification of the invention; Fig. 4 is a schematic representation of a complete television receiving system embodying the invention; while Fig. 5 comprises graphs utilized in explaining the operation of a portion of the receiving system of Fig. 4.

Referring now more particularly to the drawings, there is represented in Fig. 1 an arrangement for deriving a potential representing the amplitude of a wave signal supplied by any desired signal source 10. The arrangement comprises an electron-discharge device 11 which may be either a hard vacuum tube or a vapor-electric discharge device, the latter being illustrated in the drawings. Tube 11 has an anode 12, a cathode 13, and a pair of intermediate electrodes 14 and 15.

The arrangement has an anode-cathode circuit for the device, a signal supply coupled in circuit with the anode-cathode circuit for varying the potential of at least a portion of the aforesaid circuit, namely the potential of the cathode 13, with respect to a reference level in accordance with the amplitude variations of the signal to be sampled. This signal supply, for the embodiment of Fig. 1, is provided by a cathode impedance 16 connected to the output terminals of signal source 10. A condenser 17, connected through a reactor 18 to the anode 12 and adapted to be charged from a source +B through a charging resistor 19, constitutes means for applying an operating potential between the anode and cathode electrodes of tube 11. This means, as will be made clear hereinafter, is responsive to the occurrence of an electron discharge in the tube for interrupting conduction therethrough after a predetermined sampling interval. The reactor 18 may be composed, in whole or in part, of stray circuit inductance. While a variety of triggering or keying schemes may be employed to initiate an electron discharge in the tube, a synchronizing terminal 20 is shown, being coupled to the input electrodes 13 and 14 through a condenser 21 and grid resistor 22.

An energy-storage device, such as a condenser 23, is included in the sampling arrangement and constitutes an impedance coupled to the intermediate electrode 15 and to the cathode 13 for deriving a potential determined by the amplitude of the signal output of source 10 within a sampling interval. It has a normally interrupted charging circuit, comprising intermediate electrode 15 and cathode 13, which is completed in response to the occurrence of an electron discharge in tube 11 to establish a potential on the condenser 23.

In considering the operation of the described arrangement, it will be understood that tube 11 is normally maintained in a nonconductive condition. For such operating intervals, the signal output of source 10 develops a potential across cathode impedance 16 which causes the cathode potential to vary with respect to ground in accordance with amplitude variations of the signal output of the source. If it be assumed that condenser 17 is fully charged from source +B, the application of a keying signal of positive polarity to synchronizing terminal 20 initiates an electron discharge in tube 11. When the tube is thus broken down or rendered conductive, a low-resistance path is formed across all four of its electrodes, whereby the aforedescribed charging circuit for condenser 23 is completed. Condenser 23 is thus charged to establish thereacross a potential which corresponds to a close approximation to the cathode potential of tube 11 during the conductive interval thereof. In other words, the potential established on condenser 23 is determined by the amplitude of the signal output of source 10 during a sampling interval because the charging circuit for the condenser, including cathode impedance 16, is complete throughout this interval.

The occurrence of an electron discharge in tube 11 is also effective simultaneously to discharge condenser 17. In fact, the duration of the conductive interval of tube 11, which is the sampling period, is determined by the discharge process of this condenser. The tube is conductive for approximately one-half the period of the series-resonant frequency of elements 17 and 18 because, at the end of that time, the anode potential of the tube is reduced to an insufficient value to sustain ionization. In this manner, conduction through the tube is interrupted and the charging circuit for condenser 23 is disabled after a short interval of a predetermined duration. In the illustration of Fig. 1, a closed circuit including condenser 23 is obtained only during such conductive periods of tube 11. Consequently, this condenser retains its charge at the end of the sampling interval and exhibits a potential determined by the amplitude of the signal from source 10 during the sampling time. This potential is available at an output terminal 24.

The operation just recited is predicated upon the further assumption that the signal output of source 10 has a substantially constant value throughout the sampling time. This condition is usually realized in practice since the sampling time is of an extremely short duration. However, should the amplitude of the signal from source 10 vary while the sampling is being conducted, the resulting potential of condenser 23 represents the amplitude at the end of the sampling process.

After any given sampling operation has been completed, the slow charging of condenser 17 from source +B through charging resistor 19 permits complete deionization to take place in tube 11. When condenser 17 has become fully charged for the second time, another triggering pulse may be applied to terminal 20 to effect a further sampling of the signal output of source 10.

It is necessary, of course, that the range of signal potentials applied to cathode 13 be within the circuit capacity. The cathode must not reach such a maximum positive potential as to prevent initiation of a discharge within the tube in response to an applied triggering signal; its excursion in the negative direction must not become so great that the tube is fired in the absence of the triggering signal; and the limits in the positive and negative directions must be maintained as described even in the presence of a potential established on sampling condenser 23.

The arrangement of Fig. 1 has many desirable features. In the first place, through the use of a gas-filled or vapor-electric tube, the potential estabilshed by condenser 23 closely represents the amplitude of the sampled signal since the potential drop in such a tube is exceedingly small. Furthermore, the ionization phenomenon within the gas tube permits the charge on condenser 23 to be altered in either direction during any conductive interval to provide accurate sampling indications. This bidirectional effect, found only in gas-tube modifications of the invention, results from the fact that ionization within the tube provides a supply of positive ions and negative electrons for charging condenser 23 in either sense as required by any given sampling process.

However, in a system employing a hard vacuum tube conduction to the sampling condenser is possible in only one direction due to the presence of electrons alone in the tube. This means that such arrangements may experience recovery time effects that may be undesired in some installations. In other words, the potential of condenser 23 in hard-tube applications may be reduced only by way of leakage in a circuit external to the tube.

The potential-supply arrangement for the tube, including condenser 17, permits the sampling intervals to be of uniform duration and to be independent of the duration of the triggering signal. This desired result is approximately obtained where hard tubes are employed so long as the duration of the keying pulse is at least equal to that of the sampling time. However, this result is completely realized through the use of vapor-electric tubes irrespective of the duration of the keying pulse. Furthemore, the duration of the sampling interval may be appropriately selected to any desired value within a wide range of values through suitable choice of elements 17 and 18.

It is to be noted that the discharge path of condenser 17 in the arrangement of Fig. 1 includes the cathode impedance 16. Consequently, the cathode impedance must be small if the potential developed by condenser 23 during any sampling interval is not to reflect, to any appreciable extent, the discharge current of condenser 17. This limitation is obviated in the circuit arrangement of Fig. 2 which is generally similar to that of Fig. 1, corresponding components thereof being identified by the same reference characters. In Fig. 2 the discharge circuit for condenser 17, including the anode and cathode of tube 11, is exclusive of cathode impedance 16. With this modification the potential of condenser 23 is substantially independent of the discharge current of condenser 17.

In Fig. 3 the sampling arrangement of the present invention is utilized in an automatic control system for the timer chain conventionally employed in television transmitting systems. As there represented, the sampling arrangement includes a four-element gas tube 30, having an anode which is grounded by way of an anode impedance 31. A condenser 32, which may be charged through a resistor 33 from a source —B, applies an operating potential to the cathode of tube 30 through a reactor 34. A sampling condenser 35 is connected between one intermediate electrode of tube 30 and ground.

The timing impulse generator, which may be considered as representing the timing chain of a television transmitting ssytem, is shown in block diagram at 40. One output circuit at which 60-cycle timing pulses are available is connected through a coupling condenser 41, a grid resistor 42, and bias source $-E_c$ to the cathode and first intermediate electrode of tube 30. The operating frequency of the timing impulse generator is under the control of a conventional reactance tube 45 which, in turn, is controlled by the potential developed by sampling condenser 35 and applied to the reactance tube over a conductor 44. The terminal designated 43 permits the application of a 60-cycle signal from the commercial power supply to the anode load 31.

This system operates in substantially the same manner as that of Fig. 1. The anode potential of tube 30 varies with respect to ground in accordance with the 60-cycle supply with reference to which the operation of the timing impulse generator 40 is to be phased. The timing impulse generator applies to the input circuit of tube 30 keying pulses which occur at a rate of approximately 60 per second. These pulses sample the 60-cycle signal applied to terminal 43 and develop a potential on condenser 35 in accordance with the phase relation of the triggering pulse and the 60-cycle signal. As the phase relation of these signals tends to vary, the potential of condenser 35 varies and through reactance tube 45 adjusts the operating frequency of timing impulse generator 40 to maintain a desired phase relation.

The television receiving system of Fig. 4, embodying the present invention in a control system, is of the superheterodyne type and comprises a radio-frequency amplifier 50 of any desired number of stages coupled to an antenna-ground system 51, 52. Connected in cascade to the output circuit of radio-frequency amplifier 50, in the order named, are an oscillator-modulator 53, an intermediate-frequency amplifier 54 of any desired number of stages, a detector and automatic-contrast-control (ACC) supply 55, a video-frequency amplifier 56 of one or more stages, and an image reproducer 57. A line-scanning generator 58 to be described more particularly hereinafter and a field-scanning generator 59 have output circuits coupled to image reproducer 57 for effecting scanning operations of the electron beam therein. Synchronization of line-scanning generator 58 is under the control of a sampling circuit 60 having one input terminal coupled to the line-scanning generator and a second input terminal coupled to the line-synchronizing-signal output terminal of a synchronizing-signal separator 61. The field-scanning generator 59, which may be controlled by a similar arrangement, is illustrated for simplicity as coupled directly to the field-synchronizing-signal output terminal of separator 61 for synchronization therefrom in conventional manner. The separator 61, in turn, is connected with an output circuit of detector 55. A contrast-control voltage derived from detector 55 is applied to one or more tubes of stages 50, 53, and 54. A unit 62 for reproducing sound signals accompanying the received television signals is coupled to an output circuit of intermediate-frequency amplifier 54.

Except for the sampling or control unit 60, the described system corresponds generally with a conventional television receiver of the superheterodyne type, the operation of which is well understood in the art. Briefly, television signals intercepted by antenna circuit 51, 52 are selected and amplified in radio-frequency amplifier 50 and applied to oscillator-modulator 53 wherein they are converted into intermediate-frequency signals. These signals, in turn, are selectively amplified in intermediate-frequency amplifier 54 and delivered to detector 55. The modulation components of the received signal are derived by detector 55 and are supplied to video-frequency amplifier 56 and, after amplification therein, are supplied in the usual manner to the brilliancy-control electrode of image-reproducing device 57. Modulation components are also supplied from detector 55 to synchronizing-signal separator 61 wherein the line- and field-synchronizing signals are separated. The line-synchronizing signals are employed properly to synchronize line-scanning generator 58 and the field-synchronizing signals are utilized to synchronize field-scanning generator 59. The intensity of the scanning ray of the device 57 is modulated or controlled in accordance with the video-frequency voltages impressed upon its control electrode. Synchronized scanning waves generated in the line-scanning and field-scanning generators 58 and 59, respectively, and applied to the scanning elements included in reproducing device 57, produce scanning fields, thereby to deflect the cathode-ray beam in two directions normal to each other so as to trace a rectilinear scanning pattern and reconstruct the transmitted image. An automatic-contrast-control bias derived from detector 55 and applied to one or more of stages 50, 53, and 54 serves to maintain the amplitude of the signal input to detector 55 and unit 62 within relatively narrow limits for a wide range of received signal intensities. Sound signals accompanying the received television signals are reproduced in unit 62 in conventional manner.

Referring now more particularly to line-scanning generator 58, this component comprises a well-known form of saw-tooth oscillator of the blocking-tube type. It is provided by a triode vacuum tube 65 the anode of which is connected to a source of space current, indicated +B, by way of a winding 66 and a resistor 67. The cathode of the tube is grounded and its input circuit includes a winding 68, inductively coupled with winding 66 to provide a feed-back path for the oscillator, and a condenser 69. The oscillator has a grid resistor 70 which is connected to a control tube 75 to be described presently. Condenser 71 is an integrating condenser and terminal 72 represents the output terminal of the oscillator. The control tube 75 is also of the triode type, having its cathode directly grounded and having its anode connected to the source +B through a resistor 76. A connection from the output circuit of the control tube through the grid resistor 70 constitutes means for adjusting the bias of the oscillator to control its operating frequency.

The sampling circuit 60 is the same as that heretofore described in connection with Fig. 2 and corresponding components thereof are designated by the same reference characters. In this application of the sampling device, a condenser 73 is connected across cathode impedance 16 to constitute an integrating circuit coupled to oscillator 58 by way of windings 79 and 66. The integrating circuit 16, 73 is chosen to respond to the signal obtained from oscillator 58 through transformer 66, 79 and to establish on the cathode of tube 11 a saw-tooth signal similar in amplitude and phase to that delivered to reproducing device 57 from output terminal 72. The input circuit of gas tube 11 is connected through the condenser 21 to the line-synchronizing-signal terminal of separator 61. Its sampling condenser 23 is coupled through a filter to the input circuit of control tube 75 included in the line-scanning generator 58, this filter comprising a resistor 77 and a shunt condenser 78.

Referring now more particularly to the controlled operation of unit 58, it will be understood that the oscillator thereof operates in a conventional manner to produce a signal of saw-tooth wave form which effects the line-scanning process in reproducing device 57. The operating frequency of the oscillator is determined by the conductivity of its control tube 75 which adjusts the net bias applied to the control electrode of tube 65.

One cycle of the line-scanning signal, as established on the cathode of sampling tube 11, is represented by full-line curve A of Fig. 5. It has a relatively long trace portion followed by a relatively short or rapid retrace portion. This signal causes the cathode potential of tube 11 to vary with reference to ground in accordance with amplitude variations of the saw-tooth output of the line-scanning oscillator. Sampling of the saw-tooth signal by unit 60 is timed by the line-synchronizing pulses from separator 61, applied to the input circuit of tube 11 and utilized to time the occurrence of an electron discharge in this tube. One such synchronizing pulse is shown in curve B of Fig. 5.

The separator 61 is arranged so that for normal operation, that is for correct phasing, the line-synchronizing pulse B occurs at the mid-point of the retrace portion of the saw-tooth line-scanning signal, as indicated by the time relationships in the full-line curves of Fig. 5. So long as this phase relationship is maintained, the potential developed by sampling condenser 23 and delivered by way of filter 77, 78 to the control electrode of tube 75 establishes the proper bias and operating frequency in the circuit of line-scanning oscillator. Should the phase relations vary, as may result from a shift in the operating frequency of the line-scanning oscillator due to tube aging or the like, the potential derived by condenser 23 in the immediately succeeding sampling intervals is modified in a manner to restore the proper phase relations. This may be most easily understood from a consideration of a particular condition of improper phasing.

For this purpose, assume that the saw-tooth signal of the line-scanning oscillator occurs as shown in the broken-line curve A'. The vertical construction line *s* of Fig. 5 shows that the potential of the sampling condenser 23 for this condition is less than that developed when the synchronizing pulse occurs midway in the retrace portion of the line-scanning signal. Since the potential of the sampling condenser has become less negative, tube 75 is rendered more highly conductive. As a consequence, its anode potential and the bias of the oscillator decrease. This slows down the oscillator or reduces its operating frequency to restore the desired phase relation in which the line-synchronizing pulses occur at the mid-point in the retrace portion of the line-scanning signal. Conversely, where the oscillator is running too slow, the potential of sampling condenser 23 increases and, by driving control tube 75 in the direction of anode-current cutoff, increases the oscillator frequency and restores the desired phase relation. In this fashion, the sampling unit 60 maintains a predetermined phase relation between the line-scanning signal and the line-synchronizing pulses, thereby ensuring proper scanning in reproducing device 57. While unit 60 in Fig. 4 is the same as the sampler of Fig. 2, it will be understood that the modifications of Figs. 1 and 3 are also adapted to the same type of control system.

The filter 77, 78 smooths out the control potential applied from the sampling condenser 23 to the input electrodes of control tube 75. While a very simple type of filter has been illustrated, it will be understood that more complex arrangements may be used to have the filtering as complete as desired for smooth and efficient control of the saw-tooth oscillator. In the absence of the filter, the potential from condenser 23 may exhibit a pronounced line-frequency component, the rate at which the sampling is carried on.

From the foregoing description it will be clear that the unit 58 comprises a control system for utilizing the potential derived across the condenser 23 to control a characteristic of the signal applied to the cathode of the tube 11, namely the frequency of that signal or the phase relationship between that signal and the synchronizing pulses from the separator 61.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An arrangement for deriving a potential representing the amplitude of a wave signal during a sampling interval comprising, an electron-discharge device having an anode, a cathode and an intermediate electrode, an anode-cathode circuit for said device, a signal supply coupled in circuit with said anode-cathode circuit for varying the potential of at least a portion of said circuit with respect to a reference level in accordance with amplitude variations of said wave signal, means for initiating an electron discharge in said device, means for interrupting conduction in said device after a predetermined sampling interval, and an energy-storage device coupled to said intermediate electrode and to said cathode for deriving a potential determined by the amplitude of said wave signal within said sampling interval.

2. An arrangement for deriving a potential representing the amplitude of a wave signal during a sampling interval comprising, a gaseous-discharge device having an anode, a cathode, and an intermediate electrode, an anode-cathode circuit for said device, a signal supply coupled in circuit with said anode-cathode circuit for varying the potential of at least a portion of said circuit with respect to a reference level in accordance with amplitude variations of said wave signal, means for initiating a gaseous discharge in said device, means for interrupting conduction in said device after a predetermined sampling interval, and an energy-storage device coupled to said intermediate electrode and to said cathode for deriving a potential determined by the amplitude of said wave signal within said sampling interval.

3. An arrangement for deriving a potential representing the amplitude of a wave signal during a sampling interval comprising, an electron-discharge device having an anode, a cathode, and an intermediate electrode, an anode-cathode circuit for said device, a signal supply coupled in circuit with said anode-cathode circuit for varying the potential of at least a portion of said circuit with respect to a reference level in accordance with amplitude variations of said wave signal, means for initiating an electron discharge in said device, means for interrupting conduction in said device after a predetermined sampling interval, an energy-storage device, and a normally interrupted charging circuit for said storage device including said intermediate electrode and said cathode, which is completed in response to the occurrence of said electron discharge to establish a potential on said storage device determined by the amplitude of said wave signal within said sampling interval.

4. An arrangement for deriving a potential representing the amplitude of a wave signal during a sampling interval comprising, an electron-discharge device having an anode, a cathode and an intermediate electrode, an impedance connected with said cathode for establishing thereon a potential which varies with respect to a reference level in accordance with amplitude variations of said wave signal, means for initiating an electron discharge in said device, means for interrupting conduction in said device after a predetermined sampling interval, and an energy-storage device effectively coupled across said impedance only in the presence of said electron discharge for deriving a potential determined by the amplitude of said wave signal within said sampling interval.

5. An arrangement for deriving a potential representing the amplitude of a wave signal during a sampling interval comprising, a gaseous-discharge device having an anode, a cathode and an intermediate electrode, an anode-cathode circuit for said device, a signal supply coupled in circuit with said anode-cathode circuit for varying the potential of at least a portion of said circuit with respect to a reference level in accordance with amplitude variations of said wave signal, means for initiating a gaseous discharge in said device, a condenser for applying an operating potential to said anode and cathode electrodes and to be discharged in response to the occurrence of said gaseous discharge for interrupting conduction in said device after a predetermined sampling interval, and an energy-storage device coupled to said intermediate electrode and to said cathode for deriving a potential determined by the amplitude of said wave signal within said sampling interval.

6. An arrangement for deriving a potential representing the amplitude of a wave signal during a sampling interval comprising, a gaseous discharge device having an anode, a cathode, and an intermediate electrode, a cathode impedance for establishing on said cathode a potential which varies with respect to a reference level in accordance with amplitude variations of said wave signal, means for initiating a gaseous discharge in said device, a condenser for applying an excitation potential to said anode and to be discharged in response to the occurrence of said gaseous discharge for interrupting conduction in said device after a predetermined sampling interval, an energy-storage device, and a normally interrupted charging circuit for said storage device, including said cathode and intermediate electrode, which is completed in response to the occurrence of said electron discharge to establish a potential on said storage device determined by the amplitude of said wave signal within said sampling interval.

7. An arrangement for deriving a potential representing the amplitude of a wave signal during a sampling interval comprising, a gaseous discharge device having an anode, a cathode, and an intermediate electrode, an anode impedance for establishing on said anode a potential which varies with respect to a reference level in accordance with amplitude variations of said wave signal, means for initiating a gaseous discharge in said device, a condenser for applying an excitation potential to said cathode and to be discharged in response to the occurrence of said gaseous discharge for interrupting conduction in said device after a predetermined sampling interval, an energy-storage device, and a normally interrupted charging circuit for said storage device, including said anode electrode and said intermediate electrode, which is completed in response to the occurrence of said gaseous discharge to establish a potential on said storage device determined by the amplitude of said wave signal within said sampling interval.

8. An arrangement for deriving a potential representing the amplitude of a wave signal during a sampling interval comprising, an electron-discharge device having anode and cathode electrodes, an impedance connected with one of said electrodes for establishing thereon a potential which varies with respect to a reference level in accordance with amplitude variations of said wave signal, means for initiating an electron discharge in said device, an anode-cathode circuit for said device exclusive of said impedance and including a condenser for applying an excitation potential to said device and to be discharged in response to the occurrence of said electron discharge for interrupting conduction in said device after a predetermined sampling interval, and an energy-storage device effectively coupled across said impedance only in the presence of said electron discharge for deriving a potential determined by the amplitude of said wave signal within said sampling interval.

9. An arrangement for deriving a potential representing the amplitude of a wave signal during a sampling interval comprising, an electron-discharge device having an anode, a cathode, and a pair of intermediate electrodes, an anode-cathode circuit for said device, a signal supply coupled in circuit with said anode-cathode circuit for varying the potential of at least a portion of said circuit with respect to a reference level in accordance with amplitude variations of said wave signal, means for applying a triggering signal to one of said intermediate electrodes to initiate an electron discharge in said device, means for interrupting conduction in said device after a predetermined sampling interval, a condenser, and a normally interrupted charging circuit for said condenser, including the other of said intermediate electrodes and said cathode, which is completed in response to the occurrence of said electron discharge to establish a potential on said condenser determined by the amplitude of said wave signal within said sampling interval.

10. An arrangement for deriving a potential representing the amplitude of a periodic wave signal during a sampling interval and for controlling the frequency of said signal comprising, an electron-discharge device having an anode, a cathode and an intermediate electrode, an anode-cathode circuit for said device, a signal supply coupled in circuit with said anode-cathode circuit for varying the potential of at least a portion of said circuit with respect to a reference level in accordance with amplitude variations of said wave signal, means for initiating an electron discharge in said device, means for interrupting conduction in said device after a predetermined sampling interval, an energy-storage device coupled to said intermediate electrode and to said cathode for deriving a potential determined by the amplitude of said wave signal within said sampling interval, and reactance-tube means coupled to said energy-storage device for utilizing said potential to control the frequency of said periodic signal.

11. An arrangement for deriving a potential representing the amplitude of a periodic wave signal during a sampling interval and for controlling the frequency of said signal comprising, an electron-discharge device having an anode, a cathode and an intermediate electrode, an anode-cathode circuit for said device, a signal supply coupled in circuit with said anode-cathode circuit for varying the potential of at least a portion of said circuit with respect to a reference level in accordance with amplitude variations of said wave signal, means for applying time-spaced synchronizing pulses to said electron-discharge device to time the occurrence of electron discharges therein, means for interrupting conduction in said device after a predetermined sampling interval, an energy-storage device coupled to said intermediate electrode and to said cathode for deriving a potential determined by the amplitude of said wave signal within said sampling interval and representing the phase relation of said periodic signal to said synchronizing pulses, and reactance-tube means coupled to said energy-storage device for utilizing said potential to control the frequency of said periodic signal to maintain a predetermined phase relation between said periodic signal and said synchronizing pulses.

ARTHUR V. LOUGHREN.

REFERENCES CITED

The following references are of record in the file of this patent:

UNITED STATES PATENTS

| Number | Name | Date |
|---|---|---|
| 2,076,335 | Dallenbach | Apr. 6, 1937 |